United States Patent [19]

Violette

[11] 4,021,142

[45] May 3, 1977

[54] PITCH-CHANGE APPARATUS FOR A DUCTED THRUST FAN

[75] Inventor: John A. Violette, Granby, Conn.

[73] Assignee: United Technologies Corporation, Hartford, Conn.

[22] Filed: Oct. 9, 1974

[21] Appl. No.: 513,323

[52] U.S. Cl. .............................. 416/167; 416/160
[51] Int. Cl.² ...................................... B64C 11/32
[58] Field of Search ........... 416/160, 162, 167, 157

[56] References Cited

UNITED STATES PATENTS

| | | | |
|---|---|---|---|
| 1,582,166 | 4/1926 | Cederquist | 416/167 |
| 2,801,068 | 7/1957 | Deriaz | 416/167 |
| 3,489,338 | 1/1970 | Chilman | 416/157 |
| 3,794,442 | 2/1974 | McMurtry | 416/167 |
| 3,801,219 | 4/1974 | Parsons et al. | 416/157 |

FOREIGN PATENTS OR APPLICATIONS

| | | | |
|---|---|---|---|
| 798,405 | 5/1936 | France | 416/167 |
| 1,012,869 | 7/1957 | Germany | 416/167 |
| 291,958 | 12/1931 | Italy | 416/167 |
| 456,407 | 1936 | United Kingdom | 416/167 |

Primary Examiner—Eugene A. Powell, Jr.
Attorney, Agent, or Firm—John D. Del Ponti

[57] ABSTRACT

A pitch-change apparatus for a ducted thrust fan having a plurality of variable pitch blades employs a rotatable ring bearing a plurality of camming members, and each of the plurality of blades is connected with a pitch-change horn engaged by one of the camming members. The ring and camming members rotate coaxially about a hub axis with the blades and rotate about the hub axis relative to the blades to collectively change blade pitch. The rotatable ring, the camming members and the pitch-change horns develop a variable mechanical advantage, and the pitch horns are connected with their respective blades so that the minimum mechanical advantage corresponds with the low-load, feathered pitch position of the blades and greater mechanical advantages correspond with the higher load, forward and reverse pitch positions of the blades.

8 Claims, 5 Drawing Figures

4,021,142

PITCH-CHANGE APPARATUS FOR A DUCTED THRUST FAN

CROSS-REFERENCE TO RELATED APPLICATIONS

This application contains subject matter which is related to copending applications Ser. No. 334,350, now U.S. Pat. No. 3,902,822, entitled Modular Gearbox for a Variable Pitch Fan Propulsor and Ser. No. 513,346 entitled Cam-Operated Pitch-Change Apparatus filed respectively on Feb. 21, 1973 and Oct. 9, 1974 by the assignee of the present invention.

BACKGROUND OF THE INVENTION

The present invention relates to apparatus for changing the pitch of a fan blade and, more particularly, is concerned with apparatus for varying the blade pitch of a ducted thrust fan having a plurality of closely spaced blades.

By-pass engines utilizing a ducted thrust fan driven by a turbine-type power plant have been recognized as exemplifying the current state-of-the-art in propulsion systems for aircraft. The fans have high by-pass ratios in the range of 5:1 or 6:1 and operate at fan pressure ratios of 1.4 to 1.5 at rated load. High blade solidity from closely spaced blades and high tip speeds are required for such ratios.

To optimize both take-off performance and cruise performance, it is desirable to vary the pitch of the fan blades. In addition, a variable pitch fan may also be used to produce reverse thrust during landings. Other reversing devices can be eliminated. Accordingly, a variable pitch thrust fan is currently favored by several propulsion system manufacturers.

Providing a pitch-change apparatus for a ducted thrust fan is complicated by several factors. The apparatus should be light-weight and compact since it will be mounted in the fan hub. The hub rotates at high speed to obtain the high by-pass and pressure ratios and, hence, centrifugal growth must be considered. The large number of blades in close proximity to one another at the hub and the large blade angles through which each blade must be turned to go from forward to reverse pitch place stringent requirements on the size of the apparatus and the magnitude of the displacements and forces produced by the apparatus. Non-linear variations in the blade twisting moments in the range from forward to reverse pitch through feathered pitch must be accommodated by the control loads carried by the apparatus. The possibility of fore-and-aft vibratory motions of the blade must also be accommodated in the pitch-change apparatus.

U.S. Pat. No. 3,902,822 by Andrews et al referenced above and having the same assignee as this application discloses a ducted thrust fan of the type to which the present invention relates. The fan has variable pitch blades which are located within a by-pass duct at the front end of a turbine power plant. The pitch-change mechanism utilizes bevel gearing which develops a constant mechanical advantage throughout the full pitch-range. Accordingly, the gearing and the mechanism operating the gearing must be designed to accept the peak input loads in a load curve proportional to the blade twisting moment. If the pitch-change apparatus had a mechanical advantage variable in substantially the same manner as the blade twisting moments, the input load curve would be more uniform without peaks over the full pitch-range and the pitch control apparatus could be made lighter.

It is, accordingly, a general object of the present invention to disclose a pitch-change apparatus having a relatively uniform input load curve to vary the pitch of a ducted thrust fan.

SUMMARY OF THE INVENTION

The present invention resides in a pitch-change apparatus for a ducted thrust fan having a plurality of variable pitch blades. The blades extend radially from a hub and are rotatable relative to the hub about blade axes perpendicular to the hub axis. The hub is driven by a turbine-type power plant and is connected directly to the turbine for high rotational speed.

The apparatus is comprised of a pitch-change ring mounted coaxially of the hub, a plurality of pitch-change horns connected respectively to the plurality of variable pitch blades and a corresponding plurality of camming means on the ring and engaging camming surfaces of the respective horns. The pitch-change ring is fixed axially on the hub and normally rotates about the hub axis with the blades. To change pitch, however, the ring is rotated relative to the hub and blades by means of rotary actuating means.

In a preferred embodiment of the invention, the camming means are cylindrical members mounted at circumferentially spaced intervals on the pitch-change ring for rotation with the ring, and the members engage camming surfaces on the respective pitch-change horns. A pair of parallel camming surfaces are defined by a slot in the pitch-change horns and the cylindrical camming members are captured between the parallel surfaces. Rotation of the pitch-change ring causes the camming members to displace the pitch-change horns and correspondingly the fan blades.

Due to the rotational movements of the members and the pitch-change horns about different axes, the mechanical advantage of the pitch-change apparatus varies with blade pitch. The variation is substantially the same as that of the blade twisting moments in going from forward to reverse pitch through feather. The pitch change horns are connected with their respective blades to place each blade in its feathered or low-load position when the mechanical advantage of the apparatus is at a minimum. Since the minimum mechanical advantage also corresponds to the highest output rate for a given input rate, the apparatus insures a swift change of pitch through the feather position and minimizes the blade vibratory stress cycles that occur most during this relatively unstable transional mode of operation between forward and reverse pitch. The higher mechanical advantages and correspondingly lower pitch-change rates are utilized efficiently at the more common forward and reverse blade pitch positions to accurately control blade pitch and to resist higher blade twisting moments associated with these blade positions.

DESCRIPTION OF THE PREFERRED EMBODIMENTS

Figure 1:
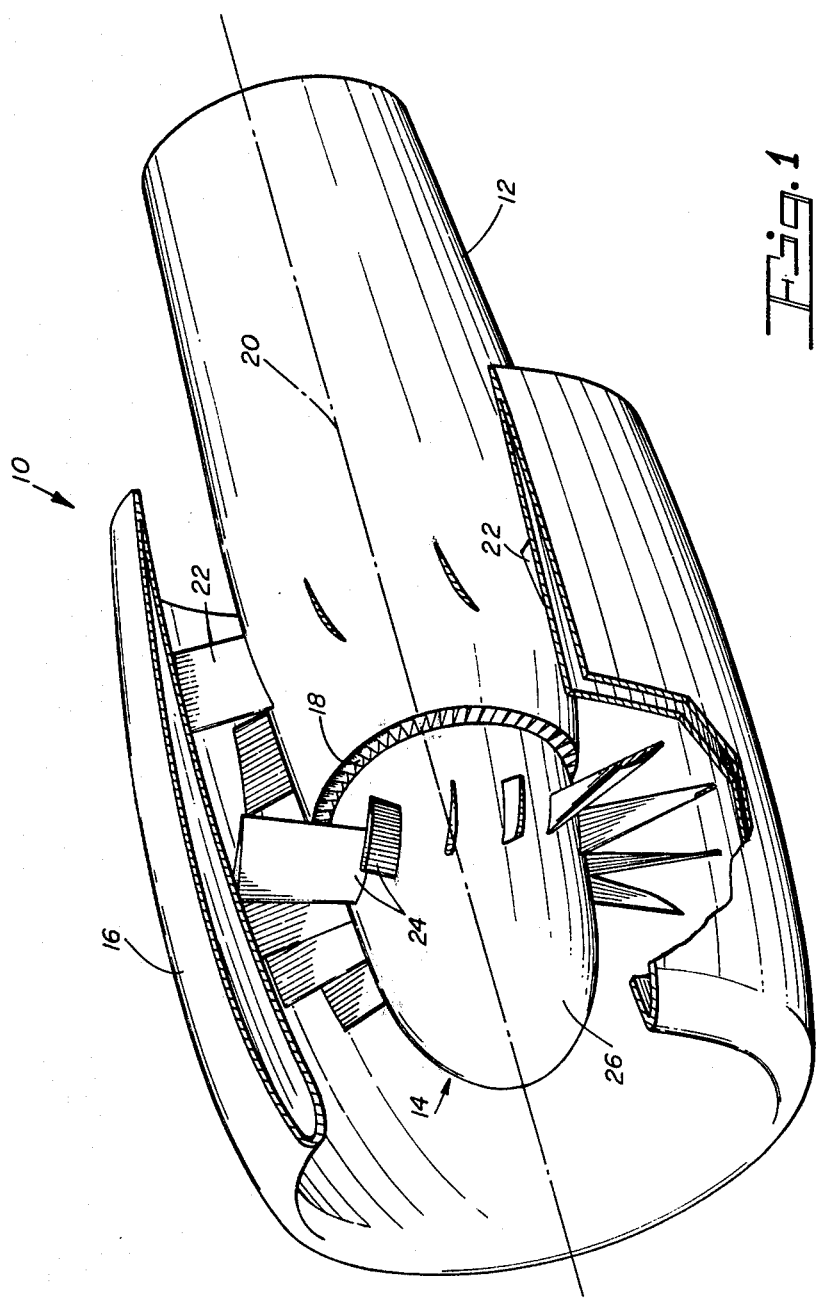
FIG. 1 is a perspective view of a ducted thrust fan propulsion unit or propulsor having variable pitch blades controlled by the apparatus of the present invention.

FIG. 1 shows a ducted thrust fan propulsion unit of the type in which the pitch-change apparatus of the present invention is employed. The propulsion unit, generally designated 10, has utility as an aircraft propulsor and has a turbine-type power plant 12 on which a thrust fan 14 and a by-pass duct 16 are mounted. The fan 14 is connected to the forward end of the power plant adjacent the compressor inlet 18 and is rotatably driven by the power plant. For example, the fan may be driven by a separate gas turbine in the engine or the fan may be driven jointly with the compressor.

The by-pass duct 16 is supported over the fan 14 and is mounted coaxially of the hub and engine axis 20 by means of a series of stand-off struts 22 to provide an annular by-pass between the power plant 12 and the trailing portion of the duct. The variable pitch blades 24 of the fan 14 extend from the hub 26 into close proximity to the inside surface of the duct 16 to insure efficient displacement of air through the fan into the compressor inlet 18 or the annular by-pass. The number of variable pitch blades 24 mounted on the hub 26 depends upon the size of the propulsion unit, and fans with 15 or more blades are not uncommon.

FIGS. 2 to 5 illustrate the pitch-change apparatus of the present invention in detail. The apparatus is housed within the hub 26 of FIG. 1 and cooperates with each of the blades 24 to collectively vary the blade pitch between forward, feathered and reverse-pitch position. The blades 24 are held in a hub housing 30 by means of bearings 32 which permit the blades to rotate about the respective blade axes 34 and thereby vary blade pitch. The hub housing 30 and the blades 24 are mounted on a power shaft 36 for rotation about the hub axis 20 by means of the power plant 12.

The mounting of the blades in the hub and the control of blade pitch is accomplished in the same manner for each blade and, therefore, the following description is limited to one blade unless the collective operation of the blades is involved.

The radially inner end of a blade 24 is connected by means of crown splines to a conically shaped sleeve 38 so that rotation of the sleeve about the axis 34 produces a corresponding change in blade pitch. The radially inward end of the sleeve 38 is captured by means of a rotatable socket 40 in a hub flange 42 bolted to the inner periphery of the hub housing 30. Thus the sleeve 38 and the flange 42 rotate about the hub axis 20 with the blades 24.

In accordance with the present invention, a pitch-change arm or horn 50 is integrally connected to the inner end of the sleeve 38 and projects in a generally radial direction away from the blade axis 34. The horn 50 has an elongated slot 52 extending along the length of the horn and the slot has two flat and parallel sides or surfaces 54 identified most clearly in FIGS. 3 and 5.

A pitch-change ring 60 is mounted on the forward end of the hub flange 42 by means of bearings 64 for rotation about the hub axis 20 relative to the blades 24 and the sleeves 38. The ring 60 supports a plurality of circumferentially spaced camming members 62, each of which is illustrated as a cylindrical roller rotatably mounted on a bolt or pin 66 at a given position on the ring 60. The axis of the pin 66 and, therefore, the axis of rotation of the camming member 62, extends through the point defined by the intersection of the blade axis 34 and the hub axis 20 for free movement through the slot 52. The roller may be provided with a slight crown at its midpoint or may be tapered slightly, together with the slot surfaces 54, toward the intersection of the blades and hub axes 34 and 20. All of the camming members 62 are located on the ring in a common plane perpendicular to the hub axis 20, and since the ring 60 is mounted at a fixed axial position by the bearings 64, the camming members 62 lie in a plane spaced by a fixed distance from and parallel to the plane intercepted by the blade axes 34.

Each one of the camming members 62 is captured between the parallel surfaces 54 of a pitch-change horn 50 with minimum clearance. When the pitch-change ring 60 is rotated, a member 62 engages one of the surfaces 54 and rotatably displaces the corresponding pitch horn 50 to rotate the associated sleeve 38 and blade 24 about the axis 34. Accordingly, the parallel surfaces 54 serve as camming surfaces, and the camming members 62 serve as camming means operating upon the surfaces to control blade pitch.

Figure 2:
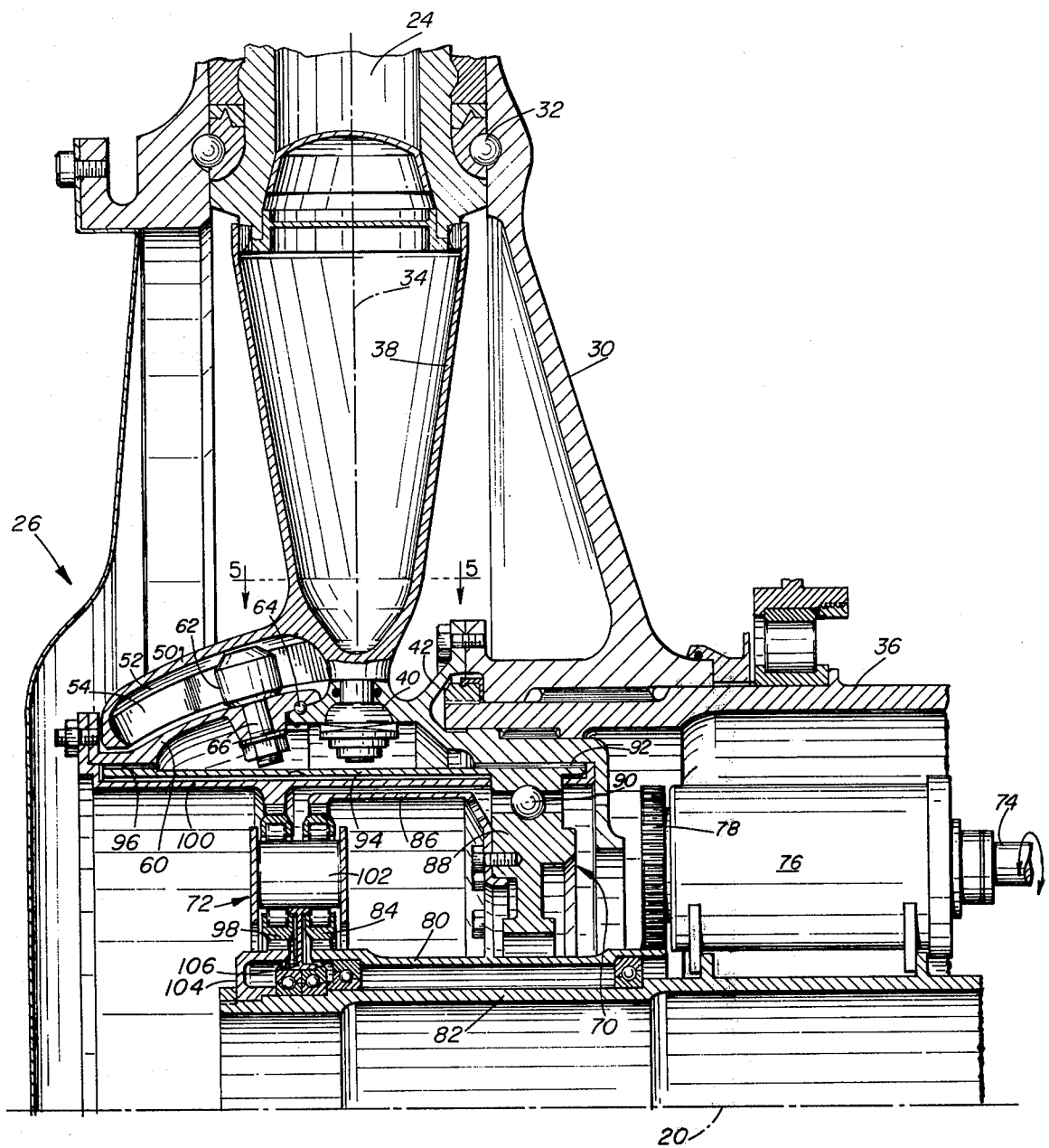
FIG. 2 is a longitudinal half section of the fan showing the pitch-change apparatus mounted within the hub.

It will be observed in the sectional view of FIG. 2 that the pitch-change horn 50 is slightly curved. Such curvature is desirable but not essential as long as the camming member 62 does not become disengaged from the surfaces 54 during the arcuate motions of the member 62 and horn 50. It will be understood that the camming member 62 travels in an arcuate path about the hub axis 20 while the pitch change-horn 50 travels in an arcuate path about the blade axis 34. When the camming member 62 is closest to the blade axis 34, it is situated at the uppermost portion of its arcuate path closest to the sleeve 38. As the member 62 departs from this position, and moves to other locations on its arcuate path, it assumes lower positions relative to the pitch-change horn 50 and, hence, the horn is curved to maintain contact between the camming surfaces 54 and the member. Centrifugal forces which cause different radial growths of the pitch-change ring 60 and the pitch horn 50 are also accommodated by the parallel surfaces 54. Of course, if the slot 52 is open along the top as well as the bottom of the horn 50, and if the roller forming the camming member 62 has an adequate axial length, there may be no possibility of the camming member 62 becoming disengaged from the surfaces 54 within the finite range of pitch adjustment if the pitch-change horn 50 is not provided with the illustrated curvature.

Figure 5:
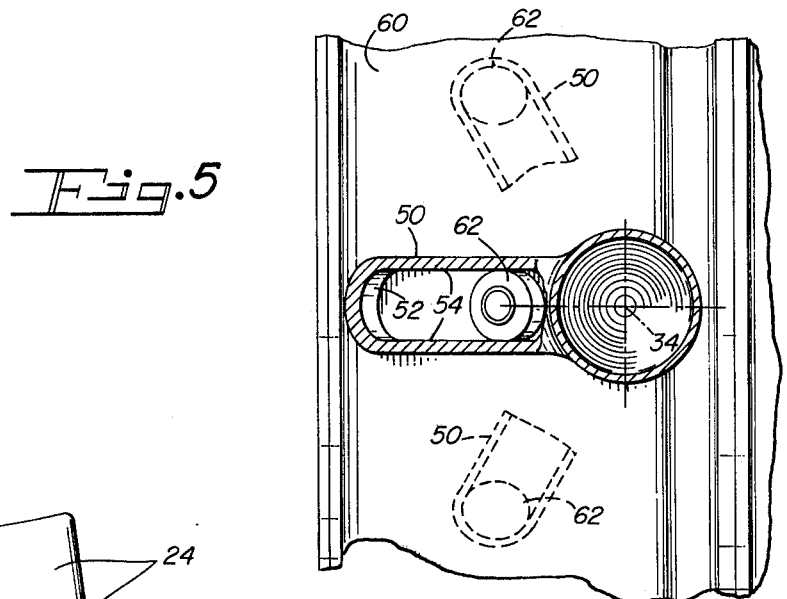
FIG. 5 is a fragmentary sectional view along the sectioning line 5—5 in FIG. 2 and shows the pitch-change apparatus at different pitch positions.
Figure 4:
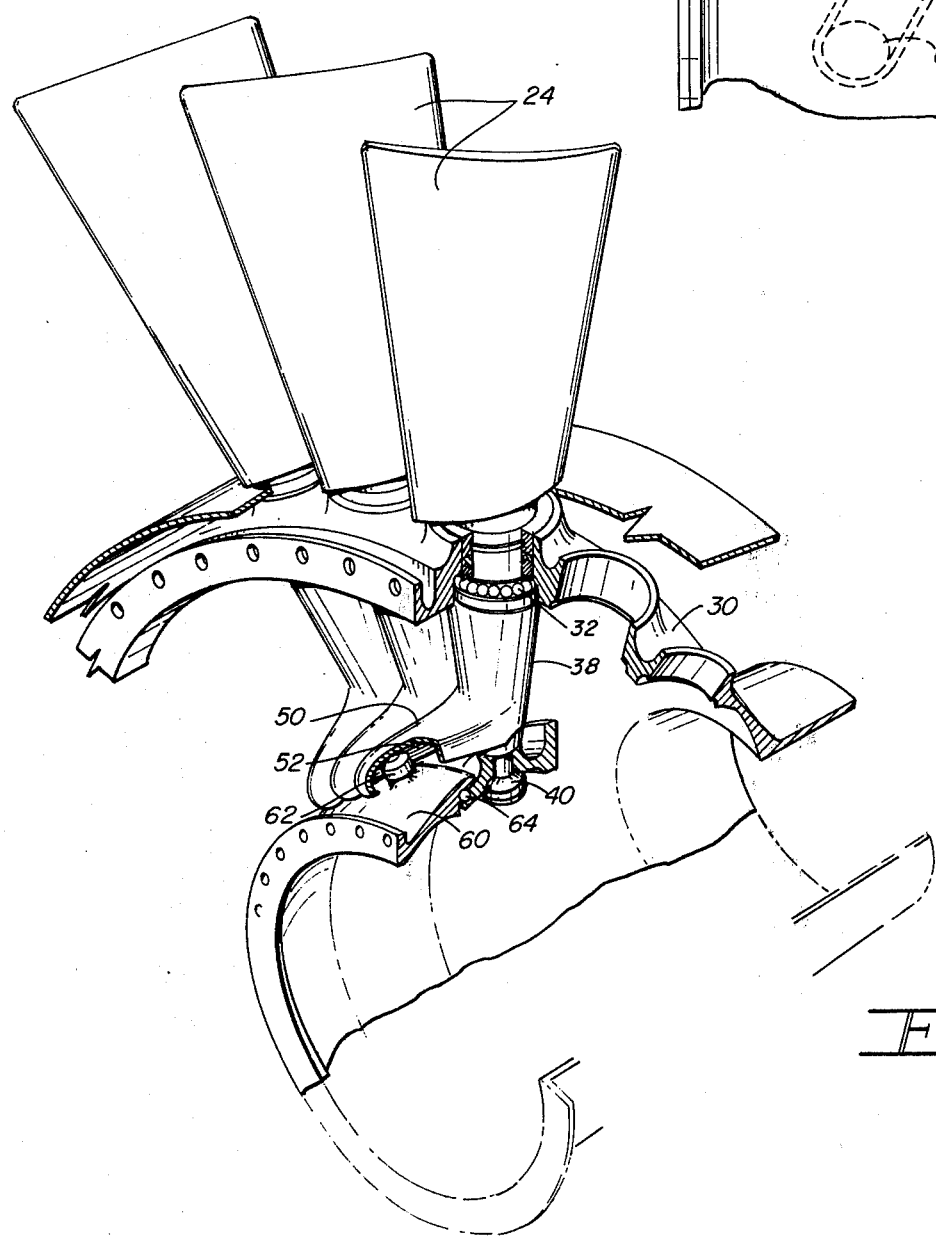
FIG. 4 is a fragmentary perspective view of the fan and pitch-change apparatus.

It is also a significant feature of the present invention that the pitch horn 50 and sleeve 38 locate the associated blade 24 in its feathered position when the camming member 62 is in the position closest to the blade axis 34 as shown in the centered or solid line position in FIG. 5. At the feathered position, the combined aerodynamic and centrifugal twisting moment exerted by the blade is zero, and with the camming member 62 at its closest position to the blade axis 34, the mechanical advantage of the pitch-change apparatus from the ring 60 to the sleeve 38 is a minimum. Correspondingly, for a given rotational input speed of the pitch-change ring 60, the rate of change of blade pitch is a maximum. The high rate of change at the feathered position aids in reducing the exposure of the blade to vibratory stress cycles which occur mostly during this relatively unstable transitional mode of operation.

As the camming member 62 rotates about the hub axis 20 to positions farther away from the blade axis 34 shown in phantom in FIG. 5, the blade 24 acquires a greater forward or reverse pitch depending upon the direction of rotation. Simultaneously, the mechanical advantage of the apparatus increases due to the greater moment arm and angular relationship of the horn 50 and ring 60, while the rate of pitch-change decreases assuming a constant rotational input to the ring 60. The increased mechanical advantage in the forward and reverse pitch ranges is desirable since these ranges are accompanied by the highest combined twisting moments of the blade. Furthermore, the decreased rate of pitch-change at forward or reverse positions is important for accurately setting and maintaining the blade pitch at these frequently used positions.

Thus the mechanical advantage is lowest at the midrange of the pitch-change apparatus corresponding to a low-load feathered position and increases at the opposite ends of the range corresponding to the high-load, reverse or forward pitch positions. This matching of the mechanical advantage and the pitch loads is important in producing an efficient device from a weight standpoint. The input loads developed by an actuator rotating the ring 60 are more uniform over the full pitch range even though the pitch-change loads developed by the blades are variable.

The use of the pitch-change horn 50 on a plurality of closely spaced fan blades is also desirable in that it permits large blade angle changes with relatively long moment arms without interference of between the pitch change components of adjacent blades. The components including the pitch-change ring 60, the camming member 62 and the pitch-change horn 50 can be located closer to the center of the fan disc than is possible with a more conventional system such as the bevel gearing shown in the above-identified U.S. Pat. No. 3,902,822. Locating the components close to the center of the disc reduces the weight of the parts, the centrifugal forces on the components, the complexity of manufacture and handling and assembly of the parts. Furthermore, when the slot 52 in the pitch-change horn 50 is closed at its radially outer end, the slot serves as a stop to limit the pitch-change angle in the forward and reverse pitch positions. Alternatively the pitch-horns may be provided with lateral limit stops so that adjacent horns abut one another when they are rotated to their extreme positions as shown, for example, in the fragmentry position of the blades in FIG. 3.

Figure 3:
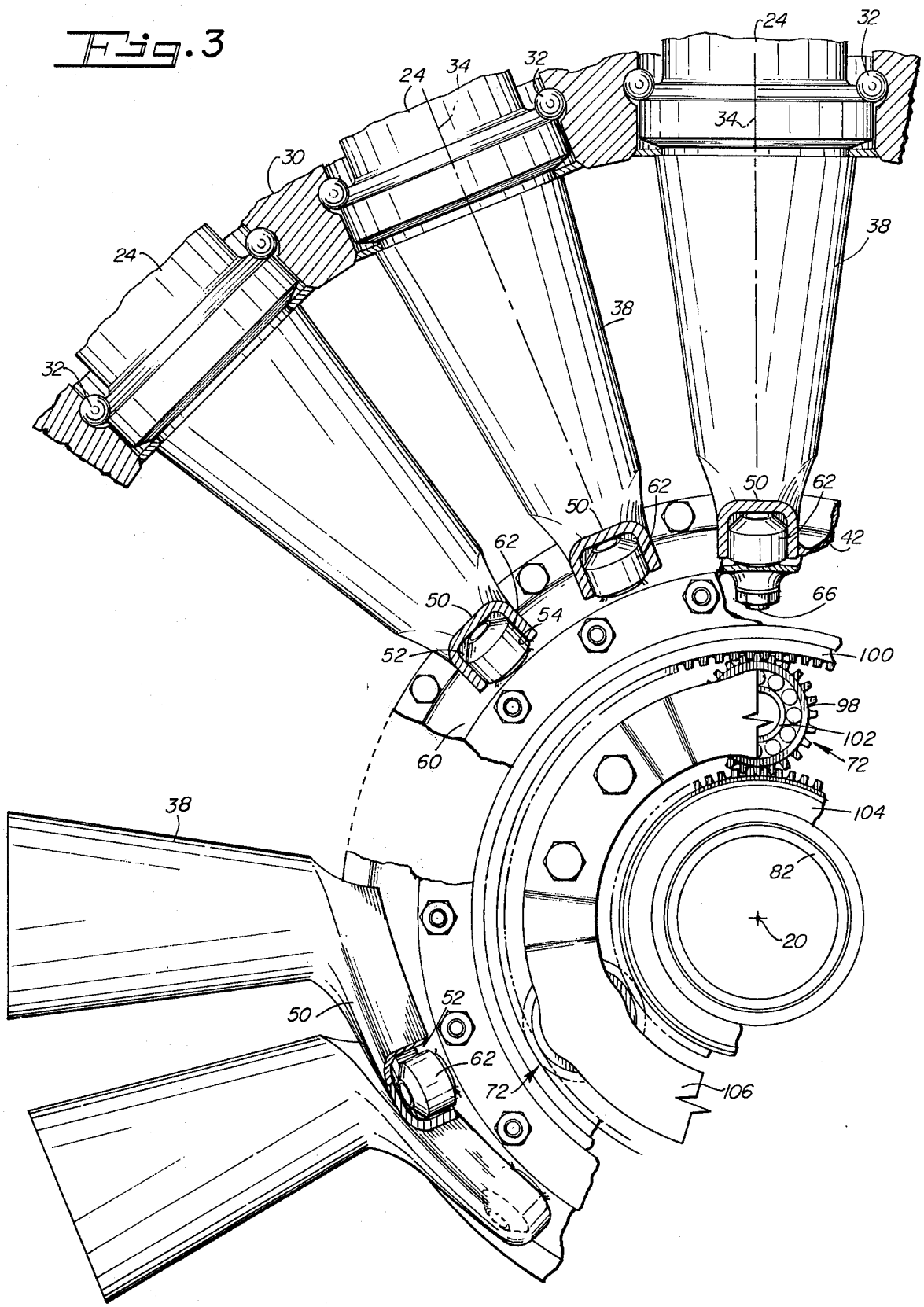
FIG. 3 is an axial end view of the hub showing fragmentary portions of the thrust fan at different pitch positions and portions of the pitch-change apparatus in section.

One rotary actuating means for rotating the pitch-change ring 60 in response to pitch-change commands from the pilot or an automatic pitch control is illustrated in FIGS. 2 and 3. As illustrated, the actuating means utilizes a high reduction ratio harmonic drive mechanism, generally designated 70, which is driven through a number of parallel connected differential gear mechanisms 72 from an input shaft 74 connected to a servomotor (not shown) elsewhere within the hub.

The input shaft 74 is connected through a one-way clutch 76 to an output gear 78 and when the input shaft rotates, the output gear 78 turns a sleeve 80 by a corresponding amount. The one-way clutch 76 is of the type disclosed in U.S. Pat. No. 3,631,951 granted to R. N. Quenneville on Jan. 4, 1972 and assigned to the Assignee of the present invention. Basically, the one-way clutch serves as a shelf-energizing brake and prevents torque feedback from the sleeve 80 to the shaft 74 when there is no input but allows input torque on shaft 74 to be transmitted to the sleeve 80 without resistance.

The clutch 76 and the sleeve 80 are mounted on a stationary shaft 82 which extends coaxially of the axis 20 into the hub. The sleeve 80 is mounted for rotation about the shaft 82 and rotates the planetary gear 84 of each differential 72.

The planetary gear 84 rotates the ring gear 86 and a wave generating disc 88 of the harmonic drive 70. The wave generating disc 88 is a non-circular inner race for the ball bearings 90 and has two or more lobes in its outer periphery which forces a flex spline 92 at one end of a flexible sleeve 94 into engagement with the internal splines of the flange 42 at two or more corresponding locations. As the wave generating disc 88 is rotated by the ring gear 86, the lobes on the disc periphery shift the points of engagement of the flex spline 92 and the flange 42 and, if the flange has a greater number of splines than the flex spline, the sleeve 94 will be shifted or rotated about the axis 20 relative to the flange 42 by an amount proportional to the rotation of the disc 88 and, correspondingly, the input shaft 74. A more thorough description of the harmonic drive can be found in the above-mentioned application 334,350.

The opposite end of the flexible sleeve 94 is connected fixedly to the pitch-change ring 60 by the splines 96. The splines 96 remain in permanent engagement with the ring 60 so that there is no relative rotational movement of the ring and sleeve. It will be understood that rotation of the input shaft 74 results in operation of the harmonic drive mechanism 70 and movement of the pitch-change ring 60 relative to the flange 42. Since the blade sleeves 38 and the blades are pivotally mounted in the flange 42, movement of the ring 60 relative to the flange causes a corresponding movement of the camming members 62 and pivoting movement of the pitch horns 50 about the blade axes 34.

Each differential 72 includes another planetary gear 98 having the same size as the planetary gear 84. The gear 98 engages a ring gear 100 fastened to the pitch-change ring 60 and a stationary sun gear 104 mounted fixedly to the end of the stationary shaft 82. The planetary gears 84 and 98 are both mounted on a pinion shaft 102 for rotation relative to the shaft and to each other, and the shafts 102 of the differentials 72 are interconnected by a cage ring 106.

By virtue of the construction, the ring gears 86 and 100, the wave generating disc 88 and the flexible sleeve 94, are interlocked and constrained by the differentials 72 to move about the hub axis 20 as a unit when the sleeve 84 and the input shaft 74 are stationary, indicating no change in the established blade pitch. When the input shaft 74 is rotated, the differential rotations of the planetary gears 84 and 98 produce relative rotations of the flange 42 and ring 60 to produce a pitch-change as described above, even though the harmonic drive 70 and differentials 72 are then rotating about the stationary shaft 82. Thus a rotary actuating means is provided and allows pitch-change inputs from a stationary servomotor to be transmitted to the rotating pitch-change ring 60 and blades.

While the present invention has been described in a preferred embodiment, it should be understood that numerous modifications and substitutions can be had without departing from the spirit of the invention. For example, the illustrated shapes of the pitch-change ring 60 and flange 42 may be changed as long as the ring 60 can be rotated about the hub axis 20 relative to the blades 24. The location of the camming members 62 on the ring 60 may also be varied to change the moment arm developed by the members about the blade axes 34. It is desirable, however, to retain the positioning of the pitch horn 50 and the camming member 62 in a plane defined by the hub axis 20 and the blade axis 34 when the blade is in the feathered position to match the mechanical advantage of the pitch change apparatus with the blade twisting moments developed as the blade moves between forward and reverse pitch through feather. Although the camming surfaces 54 of the slot 52 have been defined as being flat surfaces, it is possible that curved surfaces may be desirable in some installations. While all camming members for the plurality of blades are located on a camming ring situated forwardly of the blades, the ring may be located rearwardly of the blades or two differentially rotated rings forwardly and rearwardly of the blades respectively may be used and the blades may be connected alternately to the different rings by the pitch horns. Other rotary actuating means than that disclosed may also be used to shift pitch-change ring 60 relative to the flange 40 and blades 24. Accordingly, the present invention has been described in a preferred embodiment by way of illustration rather than limitation.

I claim:

1. A pitch-change apparatus for a ducted thrust fan having a plurality of variable pitch blades mounted on a fan hub for pivoting movement about the respective blade axes from forward pitch through feather to reverse pitch and return, said blades extending radially perpendicular from the hub axis, comprising:
   a pitch-change ring mounted coaxially of the hub at an axially fixed station for rotation about the hub axis with the hub, and relative to the hub and the blades mounted thereon;
   a plurality of pitch-change horns connected respectively to the plurality of variable pitch blades, one horn being connected with one blade for pivoting movement with the blade about the blade axis and projecting outwardly from the blade axis and arcuately downwardly toward the hub axis with a camming surface defined thereon, said camming surfaces extending substantially the entire length of the pitch-change horns and being generally aligned with the hub axis when the blades are in the feathered position; and
   a plurality of camming means on the pitch-change ring at circumferentially spaced stations for rotational movement with the ring relative to the hub and blades about the hub axis, each of the plurality of camming means engaging the camming surfaces on an associated one of the pitch horns whereby said camming means are closest to said blades when the blades are in the feathered position and rotation of the pitch-change ring moves the camming means over the camming surfaces of the associated pitch-change horns and varies blade pitch.

2. A pitch-change apparatus for a ducted thrust fan as defined in claim 1 wherein:
   the camming surfaces of the pitch horns are generally flat surfaces; and
   the pitch-change ring and camming means are rotatable relative to the hub in each direction about the hub axis away from the feathered blade position.

3. A pitch-change apparatus as defined in claim 2 wherein:
   each pitch-change horn includes a pair of parallel camming surfaces; and
   each of the camming means on the pitch-change ring comprises a camming member captured between the parallel camming surface.

4. A pitch-change apparatus as defined in claim 3 wherein the camming member is a roller.

5. A pitch-change apparatus for a ducted thrust fan as defined in claim 2 wherein:
   each pitch-change horn bears a slot closed at each end and having parallel sides defining a pair of the camming surfaces; and
   each of the camming means on the pitch-change ring is a camming member captured between the parallel camming surfaces of the respective pitch-change horn.

6. A pitch-change apparatus as defined in claim 5 wherein each of the camming members is a roller rotatably mounted on a pin at a given position on the pitch-change ring.

7. A pitch-change apparatus as defined in claim 5 wherein:
   the variable pitch blades lie in a first plane perpendicular to the hub axis;
   the camming means are cylindrical members mounted on the pitch-change ring in a second plane perpendicular to the hub axis and spaced from the first plane; and
   the pitch-change horn with the slot is connected to the blade in such a position that the cylindrical member engaging the camming surfaces of the slot is in a plane defined by the blade and hub axes when the blade is in the feathered position whereby the mechanical advantage from the rotatable pitch-change ring to the pitch-change horns is a minimum with the blade in the feathered position and greater at forward-pitch and reverse-pitch blade positions.

8. The pitch-change apparatus as defined in claim 1 further including rotary actuating means connected to the pitch-change ring for rotating the ring relative to the hub and varying blade pitch.

* * * * *